(12) United States Patent
Hagopian

(10) Patent No.: US 6,659,037 B2
(45) Date of Patent: *Dec. 9, 2003

(54) METHOD AND APPARATUS FOR THE EVALUATION OF VACUUM INSULATION PANELS

(75) Inventor: Eric M. Hagopian, Scottsdale, AZ (US)

(73) Assignee: Tuscarora Incorporated, New Brighton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/241,867

(22) Filed: Sep. 12, 2002

(65) Prior Publication Data

US 2003/0041793 A1 Mar. 6, 2003

Related U.S. Application Data

(63) Continuation of application No. 09/579,816, filed on May 26, 2000, now Pat. No. 6,470,821.
(60) Provisional application No. 60/136,039, filed on May 26, 1999.

(51) Int. Cl.[7] .............................. G01L 19/12; G01D 5/00
(52) U.S. Cl. ........................ 116/281; 116/272; 116/266
(58) Field of Search ................................. 116/200, 201, 116/206, 280, 281, 282, 283, 212, 266, 268, 272, 211; 428/69; 215/230; 206/524.8, 459.1, 459.5

(56) References Cited

U.S. PATENT DOCUMENTS

| 3,670,692 | A | | 6/1972 | Jackson | |
|---|---|---|---|---|---|
| 4,295,566 | A | | 10/1981 | Vincek | |
| 4,583,483 | A | | 4/1986 | Rausch | |
| 4,793,500 | A | | 12/1988 | Harding | |
| 4,877,143 | A | | 10/1989 | Travisano | |
| 4,986,429 | A | | 1/1991 | Singleton, Jr. | |
| 5,287,962 | A | | 2/1994 | Nomi et al. | |
| 5,289,929 | A | | 3/1994 | Heilman et al. | |
| 5,345,814 | A | * | 9/1994 | Cur et al. | 73/49.3 |
| 5,364,577 | A | * | 11/1994 | Cur et al. | 264/69 |
| 5,532,034 | A | * | 7/1996 | Kirby et al. | 428/69 |
| 5,813,454 | A | * | 9/1998 | Potter | 165/276 |
| 5,826,780 | A | * | 10/1998 | Neeser et al. | 228/217 |
| 5,900,299 | A | | 5/1999 | Wynne | |

OTHER PUBLICATIONS

NPC Incorporated, "High–Accuracy VIP Tester KTM–1000," Technical Paper, No Date.
Mathis Instruments Ltd., "TC Probe," Technical Paper, No Date.
LaserComp, "Thermal Conductivity Instrument," Technical Paper, No Date.

* cited by examiner

Primary Examiner—Diego Gutierrez
Assistant Examiner—Yaritza Guadalupe
(74) Attorney, Agent, or Firm—Burns, Doane, Swecker & Mathis, L.L.P.

(57) ABSTRACT

A vacuum insulation panel comprises a barrier film and a core material and a vacuum detection indicator. The vacuum detection indicator is configured to facilitate the evaluation of the integrity of the vacuum within the vacuum insulation panel. The vacuum detection indicator may comprise a cavity in the core material which allows the barrier material to form a depression when a vacuum is drawn within the panel. Accordingly, as the vacuum is reduced or lost, the depression formed in the barrier material will be similarly reduced or lost. In addition, the vacuum detection indicator may comprise a viewing window configured with electrical contacts above the barrier material to permit the evaluator to readily determine whether the vacuum has been reduced or lost. Further, the vacuum detection indicator may comprise a spring-like device configured within the cavity to urge the barrier film against the electrical contacts.

20 Claims, 6 Drawing Sheets

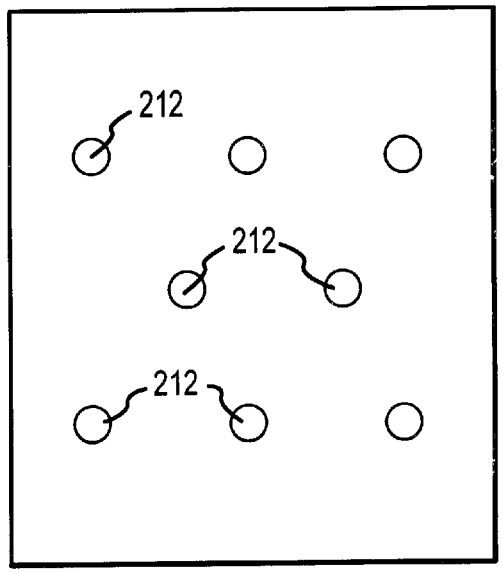
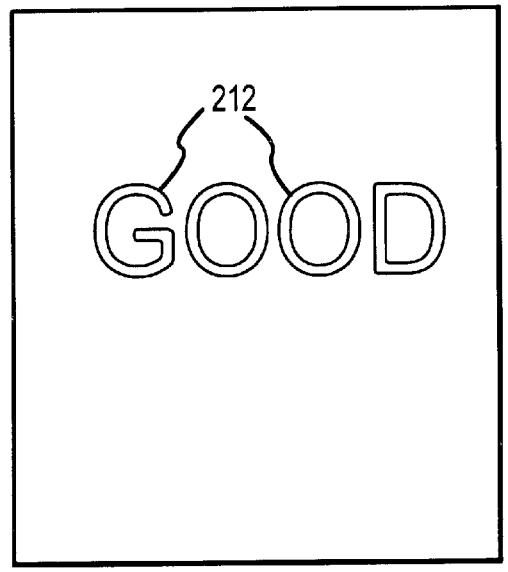
FIG.3A  FIG.3B
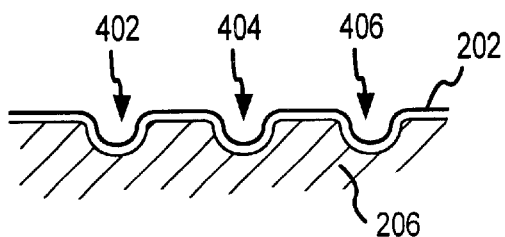
FIG.4

METHOD AND APPARATUS FOR THE EVALUATION OF VACUUM INSULATION PANELS

RELATED APPLICATIONS

This is a continuation application that claims priority on U.S. Provisional Application Ser. No. 60/136,039, filed May 26, 1999 entitled "Vacuum Insulation NPanels," hereby incorporated by reference. In addition, this application claims priority from prior pending U.S. patent application Ser. No. 09/579,816, entitled "Method And Apparatus For The Evaluation of Vacuum Insulation Panels," filed May 26, 2000, and hereby incorporated herein by reference, now U.S. Pat. No. 6,470,821.

TECHNICAL FIELD

The present invention relates, generally, to the evaluation of insulating materials, and more particularly, to vacuum insulation panels, as may be used for various temperature-sensitive products, that are configured to enable the evaluation of the expected performance and integrity of the vacuum insulation panels.

BACKGROUND OF THE INVENTION

With the rapid world-wide growth in the demand for the shipment and handling of temperature sensitive products, such as blood, food, pharmaceuticals, vaccines, bioengineered products and the like, the need for inexpensive and yet more thermally efficient shipping containers continues to increase dramatically.

In designing and manufacturing insulated shipping containers, various factors must be considered, including weight, size and durability. Since many of the products must be shipped at great distances by rail, truck or air travel, the designers of these containers must strive to keep the weight of these containers at a minimum and yet still provide sufficient protection of the goods at the desired temperature for extended periods, e.g., by providing containers with a sufficiently thick layer of insulation.

In addition, due to the volume of the goods to be shipped, as well as limitations in available cargo space, the size and configuration of the shipping container must be optimized to maintain the desired temperature and yet minimize the area required for storage. Further, the freight and shipping industry has established pricing regulations, known as dimensional weight regulations, that apply to shipping containers which are larger and yet lighter in shipping weight. For example, it can be generally more expensive to ship containers that have an outside dimension of 24"×24"×24" and a weight of 40 pounds than it is to ship containers that have an outside dimension of 12"×12"×12" and a weight of 50 or 60 pounds. Still further, although the minimization of weight and size are desirable design considerations, on the other hand, designers must strive to balance these factors with the need to provide shipping containers that are reusable or can withstand physical impacts or collisions during the shipment of the goods.

As a result of these factors, many of today's shipping containers utilize combinations of inexpensive paperboard boxes and more costly foam insulating materials, such as, for example, polyurethane, polystyrene or the like. Although these materials combine to provide a low-cost insulating container, because these materials typically attempt to trap gases to reduce heat transfer, these materials typically provide a low insulation value, such as R-7 per inch or lower.

However, as regulatory agencies continue to enact more stringent regulations for the temperature control of perishable and other temperature-sensitive goods, such as during the transporting or storing of the goods, the need for more reliable and efficient insulating materials continues to grow. As such, the use of vacuum insulation panels (VIP's) is becoming more and more predominant in industry.

Vacuum insulation panels are very efficient in providing insulating protection for temperature-sensitive goods and products. Unlike the traditional insulating materials described above, vacuum insulation materials operate by evacuating or removing the gas molecules that transfer heat within the insulating material.

With reference to FIG. 1, a vacuum insulation panel 100 generally comprises a thin, barrier film 102 that is designed to encapsulate a filler core material 106. Barrier film 102 generally comprises a thin material, such as, a metal foil or metalized film laminate, designed to maintain a vacuum within panel 100. Meanwhile, core material 106 generally comprises an open-cell material designed to provide a physical structure to panel 100, to facilitate the drawing of a vacuum from within panel 100, including vacuum area 104, and to inhibit the transmission of heat through panel 100. After drawing the vacuum within panel 100, barrier film 102 is typically sealed to maintain and hold the vacuum for a prolonged period of time. As a result, vacuum insulation panel 100 can provide approximately three times or more the insulation thermal efficiency, e.g., an R-30 per inch insulation value, than that of traditional products with the same wall thickness.

Although these vacuum insulation panels 100 are durable, often lasting two years or more, barrier film 102 is susceptible to deterioration, puncture, tear and other wear that can cause panel 100 to lose the vacuum within barrier film 102 and thus become thermally inefficient for critical temperature applications. Although a detailed visual inspection may lead an evaluator of the panels to a determination as to the integrity of the vacuum within panel 100, generally only the largely visible punctures or tears may be visible. Accordingly, because various of the defects are not readily detectable, damaged vacuum insulation panels currently have the potential to be reused, and thus the potential exposure to the environment for the temperature-sensitive goods is increased. Thus a strong need exists for a vacuum insulation panel that is configured to facilitate an effective inspection and evaluation of the integrity of the vacuum insulation panel.

SUMMARY OF THE INVENTION

A vacuum insulation panel according to the present invention addresses many of the shortcomings of the prior art. In accordance with the present invention, a vacuum insulation panel comprises a barrier film and a core material and a vacuum detection indicator. The vacuum detection indicator is configured to facilitate the evaluation of the integrity of the vacuum within the vacuum insulation panel.

In accordance with one aspect, the vacuum detection indicator comprises a cavity in the core material which allows the barrier material to form into a depression when a vacuum is drawn within the panel. As the vacuum is reduced or lost, the depression formed in the barrier material will be similarly reduced or lost.

In accordance with another aspect, the vacuum detection indicator may comprise a viewing window configured above the barrier material to permit the evaluator to readily determine whether the vacuum has been reduced or lost.

In accordance with another aspect, the vacuum detection indicator may comprise a spring-like device configured within the cavity. Upon a reduction in the vacuum with the panel, the spring-like device suitably uncoils to urge the barrier material towards the outer surface of the panel, i.e., the barrier material returns to its original configuration before the vacuum was drawn in the panel.

In accordance with yet another aspect, the vacuum detection indicator may also comprise various other features for indicating when the vacuum has been reduced or lost within the panel. In accordance with this aspect, the vacuum detection indicator may comprise of electrical contacts suitably configured to indicate that the barrier material has been returned to its original configuration, e.g., by providing a closed circuit when the barrier material interfaces with the contacts which can be readily measured or utilized. Further, the vacuum detection indicator may comprise a fluid device configured to release colored-dyes upon loss of vacuum, and which can provide a clearly visible indication of the loss of vacuum within the panel. Still further, the vacuum detection indicators may comprise small mechanical devices of even color indicators, for example, devices which in the presence of gasses either show a mechanical (e.g., a bar scale) change or a color change.

BRIEF DESCRIPTION OF DRAWING FIGURES

The present invention will be hereinafter described in conjunction with the appended drawing figures, wherein like designations denote like elements, and:

FIG. 3A is a view of an outer surface of one preferred embodiment of the vacuum insulation panel in FIG. 2;

FIG. 3B is a view of an outer surface of another exemplary embodiment of a vacuum insulation panel in accordance with the present invention;

FIG. 4 is a cross-sectional view of another exemplary embodiment of a vacuum insulation panel in accordance with the present invention;

DETAILED DESCRIPTION OF PREFERRED EXEMPLARY EMBODIMENTS

Figure 1:
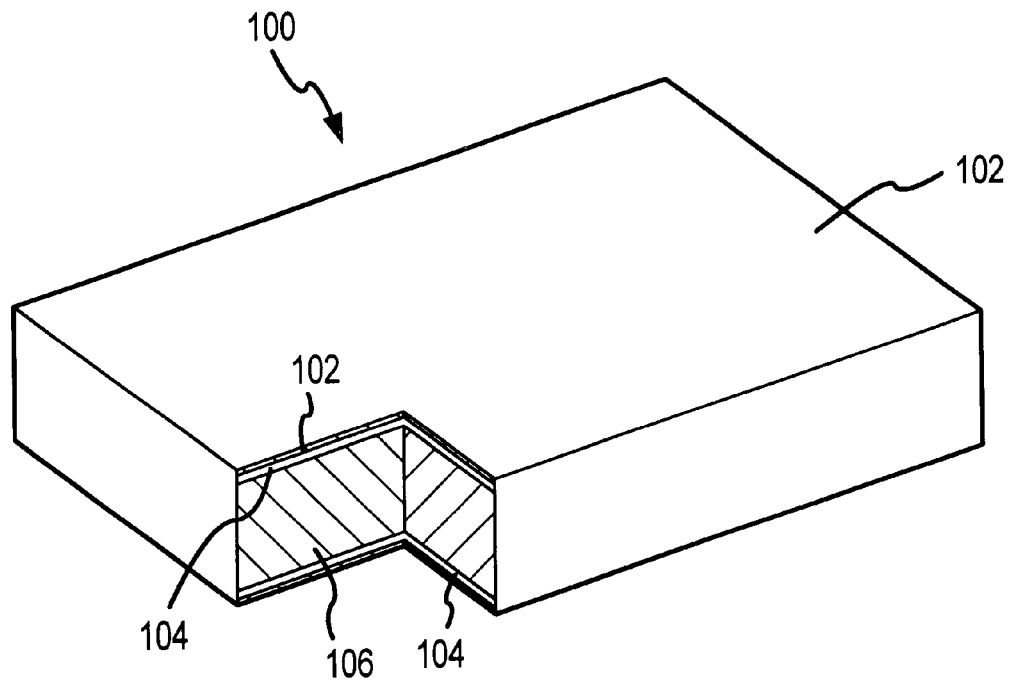
FIG. 1 is a cross-sectional, perspective view of a typical vacuum insulation panel.

The present invention is described herein in terms of various hardware components and operational steps. It should be appreciated that such components may be realized by any number of devices configured to perform the specified functions. In its various embodiments the present invention may include various types of spring-like mechanisms, tabs, plastics, and the like, which may carry out a variety of functions. However, it should be noted that these devices may be suitably modified, adapted, replace or otherwise exchanged with various other components which can carry out the desired functions. For example, while an insulating core material may comprise foam and the like, it may also comprise any type of open-cell-like material capable of facilitating a vacuum within a vacuum insulated panel. In addition, those skilled in the art will appreciate that the present invention may be practiced in any number of packaging and shipping contexts and that the illustrative embodiment described herein is merely one exemplary application for the invention. For example, the exemplary vacuum insulation panel may be configured in various sizes and configured in various arrangements, such as, small pharmaceutical product packages, or large industrial pallet shipping containers and the like. Still further, it should be noted that the present invention may be suitably practiced within any shipping application in which vacuum insulated panels are utilized For example, the present invention may be utilized not only in the shipping industry, such as for insulated shipping containers, refrigeration trucks or reefers, marine and RV refrigeration and the like, but also for general and specialized refrigeration applications, such as conventional refrigerators and freezers, cold storage units and industrial refrigerators, and vending machines. Such general techniques that may be known to those skilled in the art are not described in detail herein.

As discussed above, the deterioration of the vacuum within a vacuum insulation panel leads to a reduction of the thermal efficiency, i.e., the R-value per inch, for the vacuum insulation panel. This is generally a result of the wear and continued use of the vacuum insulation panel which eventually leads to damage to the barrier film, e.g., pin holes, tears or other perforations, or the failure or leaking at the barrier seals, all of which are generally not readily detectable. Accordingly, by providing a determination of whether the vacuum is maintained within the vacuum insulation panel, the integrity and thermal efficiency of the vacuum insulation panel can be evaluated.

In accordance with the present invention, it has been discovered that by configuring the core material and/or barrier material in a manner that a vacuum detection device is visually apparent when the vacuum is drawn within the vacuum insulation panel offers significant advantages over the prior art construction. Preferably, in accordance with one aspect of the present invention the detection device is in the form of a cavity suitably configured in the outer surface of the core material such that when a vacuum is drawn within the vacuum insulation panel, the vacuum tends to draw the barrier film into the cavity, e.g., the barrier film forms a depression within the cavity of the core material. Moreover, the depth of the depression of the drawn barrier film within the cavity can be indicative of the strength or viability of the vacuum and thus the thermal efficiency of the vacuum insulation panel. In other words, the greater the relative depth of the depression when compared to the depth of the cavity, the stronger the vacuum, and thus the stronger the insulating thermal efficiency of the vacuum insulation panel. Conversely, the lesser the relative depth of the depression when compared to the depth of the cavity, the weaker the vacuum, and thus the weaker the insulating thermal efficiency of the vacuum insulation panel.

Figure 2:
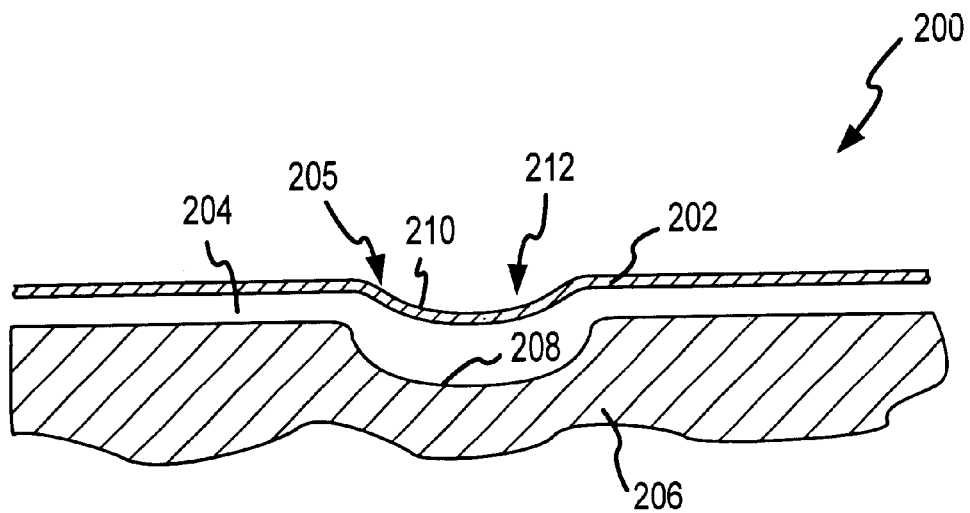
FIG. 2 is a cross-sectional view of a preferred embodiment of a vacuum insulation panel in accordance with the present invention.

In accordance with an exemplary embodiment of this aspect of the present invention, with reference to FIG. 2, a vacuum insulation panel 200 comprises a barrier material 202 and a core material 206. Barrier material 202 preferably comprises a thin, flexible, film-like material, such as, for example, a metal foil or metalized film laminate, e.g., a metalized polymer or polymeric structure. However, barrier film can also comprise a transparent, non-metallic material, or any combination of metallic and non-metallic materials. Moreover, barrier material 202 is preferably configured to suitably encapsulate core material 206 and facilitate the maintaining of a vacuum within panel 200. Further, barrier material 202 is readily deformable to provide a vacuum detection indicia 205 within panel 200, e.g., by providing a depression 212 within a cavity 208 of core material 206.

Preferably, core material 206 comprises an open-cell core material, such as, for example, an open-cell polystyrene or polyurethane foam and the like, suitably configured to facilitate the drawing of vacuum area 204 between barrier material 202 and core material 206. In accordance with this aspect, core material 206 is preferably configured to provide greater than 95% open-cell, and most preferably approximating 99% or greater open-cell material. Moreover, core material 206 is preferably configured to provide cavity 208 within an outer surface of core material 206. In accordance with this aspect, core material 206 preferably comprises a substantially rigid material.

Cavity 208 may be suitably configured in any location around the outer surface of core material 206, e.g., suitably configured on the top or bottom surfaces of core material 206, or along the sides of core material 206. In accordance with another aspect of the present invention, cavity 208, and thus depression 212, can be configured at varying depths within core material 206. For example, cavity 208 may comprise an indentation within the outer surface of core material 206. Additionally, cavity 208 may comprise a deep opening within core material 206, such as, for example, an opening half-way through the body of core material 206 or, an opening all the way through the body of core material 206. Accordingly, cavity 208 can comprise any depth of an opening within core material 206.

Accordingly, by drawing a vacuum within panel 200, depression 212 may be created within cavity 208 to suitably provide an indication of whether a vacuum exists within vacuum insulation panel 200. Stated another way, as long as the vacuum is suitably maintained within vacuum insulation panel 200, depression 212 may be suitably formed and maintained on panel 200; on the other hand, once the vacuum formed within panel 200 begins to be lost, depression 212 will likewise be reduced or no longer maintained on panel 200.

In accordance with one aspect of the present invention, vacuum insulation panel 200 may also comprise a plurality of cavities 208 suitably configured in various arrangements. In accordance with this aspect, vacuum insulation panel 200 may include cavities 208 suitably arranged in various fashions, such as uniformly spaced along the outer surface of core material 206, as shown in FIG. 3A, or randomly spaced about core material 206. As such, the plurality of cavities 208 may be suitably oriented in any pattern.

In accordance with another aspect of the present invention, cavity 208 may be arranged in any size, shape or orientation. For example, cavity 208 can comprise circular, rectangular or other multiple-sided shapes. Moreover, cavity 208 may be suitably configured in a shape which is representative of other known symbols. Additionally, cavity 208 may be configured as the symbol of an entity, such as a company's trademark or logo, or in the shape of letters or numbers.

For example, in accordance with one aspect of this embodiment and with reference now to FIG. 3B, vacuum insulation panel 200 may include a plurality of cavities 208 configured to represent a particular word, such as, for example, the word GOOD. In other words, since depression 212 will tend be created in a configuration substantially similar to cavity 208 when a satisfactory vacuum has been drawn on vacuum insulation panel 200, by configuring the plurality of cavities 208 to represent a term whose meaning is indicative of a satisfactory evaluation, e.g., GOOD, OK, GO or the like, an individual can evaluate the thermal efficiency of vacuum insulation panel 200 by inspecting and comprehending a verbal meaning or expression of the term represented by the shapes and configuration of the plurality of cavities 208. Accordingly, cavity 208 may be suitably configured to aid the evaluator of the condition of vacuum insulation panel 200 in determining and evaluating the thermal efficiency, i.e., the R-value per inch, of vacuum insulation panel 200.

Continuing with this aspect of the present invention, vacuum insulation panel 200 may also comprise a plurality of cavities 208 configured at various depths and sizes within core material 206. Accordingly, vacuum insulation panel 200 may comprise at least one cavity 208 with a minimal depth and at least one cavity 208 with a larger depth and/or size. For example, with reference to FIG. 4, vacuum insulation panel 200 may be suitably configured to include a plurality of cavities 208 configured at different depths such that a depression 402, 404 and 406 are suitably formed within cavities 208. Accordingly, the varying depths of depressions 402, 404, and 406 can provide an indication of the extent of the vacuum being maintained within vacuum insulation panel 200. For example, if each depression 402, 404, and 406 are suitably visible to an evaluator of vacuum insulation panels 200, the evaluator can conclude that the thermal efficiency of panel 200 will be satisfactory, i.e., panel 200 will efficiently perform as intended to insulate the temperature-sensitive goods. Further, in the event that one of the depressions 402, 404 or 406 is not visible, for example, a depression having a minimal depth, the evaluator can conclude that the thermal efficiency of panel 200 has deteriorated from its maximum thermal efficiency. Additionally, as more and more depressions 402, 404 or 406 become less visible, or not visible at all, the evaluator can conclude that the thermal efficiency and integrity of panel 200 has further deteriorated. Accordingly, the greater the number of depressions 402, 404 or 406 that are not visible, the more likely that the deterioration of vacuum insulation panel 200 has increased.

Although the above embodiments are configured to facilitate the evaluation of the insulating thermal efficiency of a vacuum insulation panel, it has been discovered that while these arrangements are suitable for many applications, upon deterioration or loss of the vacuum within panel 200, a readily visible indication of the integrity of the vacuum may not be available. For example, often as a result of the material comprising barrier film 202, e.g., metal foil or metalized laminate, any deformation developed as a result of the vacuum being drawn within panel 200 may still be partially present even after the vacuum has been reduced or lost, i.e., depression 212 may not return to the original configuration of the respective area of barrier film 202 above cavity 208, but may instead have a memory of the deformed characteristics. Stated another way, although the deformation of depression 212 will tend to be reduced as the vacuum in panel 200 begins to deteriorate, depression 212 may still retain a portion of the deformation which may lead an evaluator of the integrity of panel 200 to believe or conclude that some of the vacuum in panel 200 is still in effect or being maintained in vacuum area 204.

To better enable vacuum detection indicator 205 to be readily visibly detectable once the vacuum has been reduced or lost, panel 200 may be suitably configured to provide an enhanced vacuum detection indicator upon loss of vacuum. In accordance with this aspect of the present invention, enhanced vacuum detection indicator may comprise any device formed in core material and/or barrier film that enables evaluation of vacuum integrity. In accordance with one aspect of this embodiment, panel 200 may be configured to include a spring-like actuation within cavity 208 such that upon loss of vacuum within panel 200, the spring-like actuation suitably eliminates any deformation of depression 212 by acting upon depression 212 to substantially return barrier film 202 to its original configuration.

In accordance with one aspect, the spring-like actuation may be included within core material 206. For example, core material 206 may comprise a substantially rigid, open-cell material having spring-like characteristics suitably configured such that cavity 208 will be formed from an inward pressure applied to the outer surface of core material 206, but will return to a normal configuration, i.e., the original shape of core material 206, once the pressure is no longer applied. Accordingly, once an inward pressure is applied to the outer surface of core material 206 to create cavity 208, and a vacuum is drawn on panel 200, barrier film 202 can facilitate the maintaining of cavity 208 within panel 200 by forming depression 212. Moreover, once panel 200 loses the vacuum between barrier film 202 and core material 206, the spring-like characteristics of core material 206 will facilitate the elimination of cavity 208, and thus deformation 210 of depression 212.

In accordance with another aspect, the spring-like actuation may be included within an additional spring-like device within cavity 208 to substantially return barrier film 202 to its original configuration upon loss of vacuum. Accordingly, the spring-like device may comprise a spring member. Preferably, the spring member is suitably configured to be coiled by barrier film 202 upon the creation of the vacuum within panel 200, i.e., as the vacuum is created and barrier film 202 is drawn into cavity 208, the spring member may become coiled into a wound or compressed configuration as a pressure is applied by barrier film 202 onto the spring member. Further, as the vacuum within panel 200 becomes reduced or lost, and the pressure applied by barrier film 202 onto the spring member is correspondingly reduced or eliminated, the spring member may become uncoiled from its wound configuration. As the spring member becomes suitably uncoiled, the uncoiling of the spring member may facilitate the reduction or elimination of deformation 210 of depression 212 by pressing against deformation 210 and towards the outer surface of panel 200. Accordingly, by the elimination or reduction of deformation 210, and thus depression 212, the evaluator can readily determine that the vacuum of panel 200 has been reduced or lost.

It should be noted that the above example is merely one exemplary embodiment for carrying out the present invention. However, the present invention is not limited to the above embodiment. Instead, any arrangement, device or feature may be utilized which facilitates the reduction or elimination of deformation 210 of depression 212 by pressing against deformation 210 and urging deformation 210 towards the outer surface of panel 200 to permit an evaluator to readily determine that the vacuum of panel 200 has been reduced or lost.

For example, with reference now to FIG. 5, an exemplary vacuum insulation panel 500 may include a barrier film 502, a core material 506 and a vacuum detection indicator 501 which comprises a spring-like device 512. Preferably, core material 506 comprises a cavity 504 suitably configured such that barrier material 502 may form a depression 508 within cavity 504 when a vacuum is drawn between within panel 500. Further, cavity 504 is preferably configured to contain spring-like device 512 such that device 512 can reduce or eliminate depression 508 upon loss of the vacuum in panel 500.

Figures 5A, 5B:
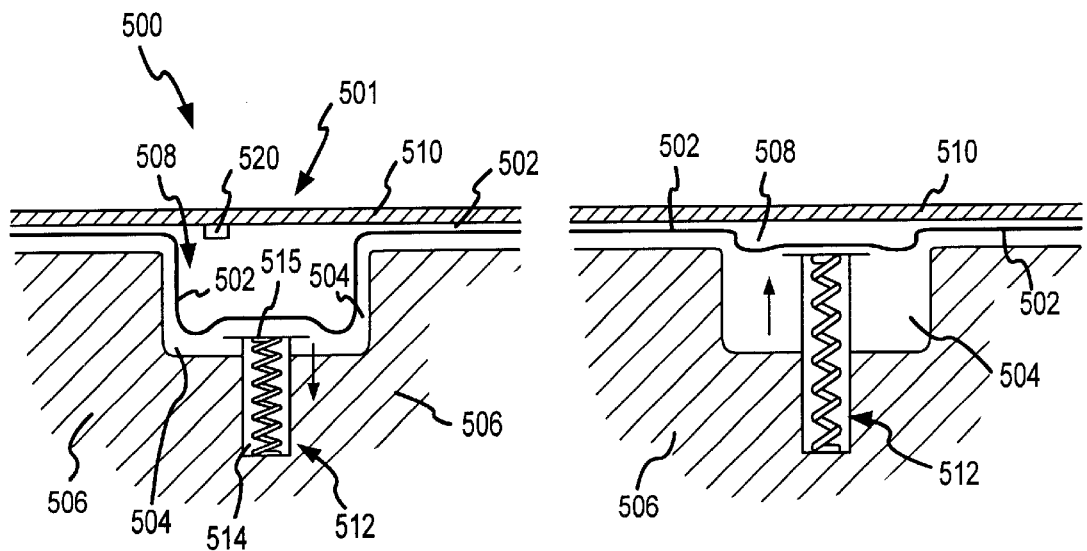
FIGS. 5A and 5B are cross-sectional views of one type of a vacuum detection system of a vacuum insulation panel in accordance with another embodiment of the present invention.

In accordance with this embodiment, spring-like device 512 preferably includes a spring member 514 and a base member 515. Spring member 514 preferably comprises a spring device that may be coiled or compressed into a retracted position by the force of barrier film 502 upon the creation of the vacuum within panel 500. Spring member 514 may comprise plastic, rubber, metal or any other material suitable for providing a spring-like actuation. Further, spring member 514 may comprise a single component spring, or may comprise a spring device integrated or otherwise implemented within a compressible tube or other like container device. Base member 515 is suitably attached to spring member 514 and preferably configured to interface with a portion of barrier film 502 when a vacuum is drawn within panel 500. Base member 515 can be configured in a variety of shapes, thicknesses and sizes. Accordingly, as shown in FIG. 5A, when the vacuum is created within panel 500, the pressure created by barrier film 502 upon base member 515 can facilitate the compression of spring member 514 into a coiled or compressed configuration, as base member 515 is positioned within cavity 504. Moreover, with reference to FIG. 5B, in the event the vacuum is subsequently reduced or lost, and spring member 514 becomes uncoiled or decompressed, base member 515 suitably interfaces with barrier film 502 to facilitate a corresponding reduction or elimination of depression 508, e.g., by pushing barrier film 502 outwards from cavity 504. Accordingly, by determining the extent of deformation in depression 508, the evaluator can readily determine that the vacuum of panel 200 has been reduced or lost.

Figure 7A:
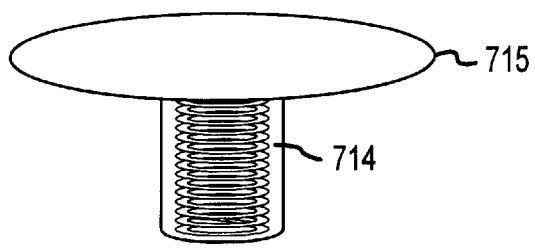
FIGS. 7A and 7B are a perspective view and a side view, respectively, of another embodiment of vacuum detection system of a vacuum insulation panel in accordance with the present invention.
Figure 7B:
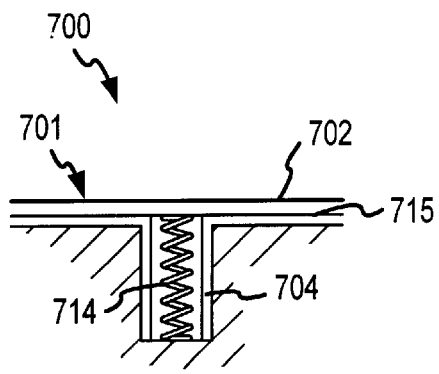

Although the above embodiment provides for base member 515 to be positioned within cavity 504, other variations can be utilized. For example, with reference to FIG. 7, a vacuum insulation panel 700 may include a vacuum detection indicator 701 having a base member 715 configured with a surface area larger than the opening to a cavity 704, and attached to a spring member 714. For example, the surface area of base member 715 may comprise a member of one inch to three inches or more in circumference or width. Accordingly, when the vacuum is created within panel 700, the pressure created by barrier film 702 upon base member 715 can facilitate the compression of spring member 714 into a coiled or compressed configuration, as base member 715 is compressed against the opening of cavity 704. Accordingly, in the event the vacuum is subsequently reduced or lost, and spring member 714 becomes uncoiled or decompressed, base member 715 suitably interfaces with barrier film 702 to facilitate a corresponding protruding configuration of barrier film 702, i.e., a protruding portion of barrier film 702 above the normal plane incident to the outer surface of barrier film 702, that will be readily detectable by an evaluator of the vacuum integrity of the panel.

In accordance with another aspect of this embodiment of the present invention, it has been discovered that by configuring a vacuum insulation panel with a viewing window, the evaluator can more readily determine the extent of deformation in a depression of the vacuum insulation panel. In accordance with this embodiment, the viewing window suitably comprises a transparent substrate, such as, for example, plastic, glass or other like materials capable of providing transparent characteristics. Preferably, the viewing window is configured to be placed on or within the outer surface of the vacuum insulation panel to substantially cover the deformation of the depression in the panel. Viewing window may be suitably attached directly to the barrier film surrounding the vacuum insulation panel by any known method for attaching like materials to the barrier film, such as, for example, by adhesion bonding, gluing, welding or fastening and the like. However, the vacuum insulation panel may also be suitably configured such that no part of the viewing window is directly attached to barrier film. Alternatively, the barrier film itself may comprise a transparent and/or non-metallic material. In this manner, a separate viewing window is not necessary, as the film itself would be see-through.

In accordance with one aspect of this embodiment, the viewing window is configured such that the portion of the barrier film comprising a depression is not attached to the viewing window to thus permit the depression to deform within the cavity. Accordingly, as the depression is reduced or eliminated as a result of a loss of the vacuum in the panel, the barrier film will suitably interface the viewing window to indicate that the depression has been substantially eliminated.

For example, as may be used with vacuum insulation panel 200, the viewing window may be configured to cover barrier film 202, preferably covering at least depression 212. However, viewing window may also suitably cover any other portion of barrier film 202, possibly even the entire barrier film surrounding core material 206. Accordingly, the evaluator can more readily determine the extent of deformation 210 in depression 212 of vacuum insulation panel 200.

In cases where a viewing window is provided, conventional gas monitors may be placed in proximity to the viewing window for visible inspection. Such gas monitors may comprise small gauge-like mechanical detectors, paper strip detectors, or the like. As is known, in the presence of certain gasses such detectors change to evidence the gas presence, for example, by changing location of a pointer or a calibrated bar scale or changing color of the strip. In the case where the detector, for example, comprises an oxygen detection strip, it may, for example, be placed inside barrier film 202 in proximity to the viewing window so that if oxygen is permitted to enter panel 200, the strip will change color and be detected through the viewing window.

With reference to FIG. 5A, in accordance with another aspect of this embodiment of the present invention, vacuum detection indicator 501 may further comprise a viewing window 510 suitably configured to cover barrier film 502, preferably covering depression 508. In accordance with this embodiment, viewing window 510 suitably comprises a transparent substrate, such as, for example, plastic, glass or other like materials capable of providing transparent characteristics. Preferably, viewing window 510 is suitably attached directly to barrier film 502 by any known method for attaching like materials to barrier film 502, such as, for example, by adhesion bonding, gluing, welding or fastening and the like. In addition, viewing window 510 is preferably configured such that the portion of barrier film 502 comprising depression 508 is not attached to viewing window to permit depression 508 to deform within cavity 504, as shown in FIG. 5A. However, panel 500 may also be suitably configured such that no part of viewing window 510 is directly attached to barrier film 502. Accordingly, with reference to FIG. 5B, once the vacuum in panel 500 is subsequently reduced or lost, and spring member 514 becomes uncoiled or decompressed, base member 515 suitably interfaces with depression 508 to force a corresponding portion of barrier film 502 towards viewing window 510. Accordingly, by determining the extent of the deformation in depression 508 through viewing window 510, the evaluator can determine whether the vacuum of vacuum insulation panel 200 has been reduced or lost.

Although the above embodiments are configured to facilitate the visual indication and evaluation of the insulating thermal efficiency of an vacuum insulation panel, in accordance with other exemplary embodiments of the present invention, further features of the present invention for evaluating insulating materials can readily assist the evaluator of the panels. As noted, the above embodiments suitably provide the evaluator with a visual method for determining the extent of the vacuum present in a vacuum insulation panel, by providing for a visual inspection of the amount of deformation of any depressions in the vacuum insulation panel. However, other devices may be employed to indicate that any provided depressions have been reduced, and/or that the vacuum in the panel has been reduced or lost within the various embodiments of the present invention.

For example, in accordance with another exemplary embodiment, the vacuum insulation panel comprises a viewing window having at least one pair of electrical contacts suitably arranged within the underside of the viewing window to interface with a portion of the barrier film providing the depression in the panel. Preferably, the electrical contacts are isolated from each other, i.e., there is no electrical continuity between the electrical contacts. Moreover, in accordance with this embodiment, the barrier film includes a contact portion suitably arranged with any such depressions and configured to interface with the electrical contacts of the viewing window once a depression has been substantially reduced or eliminated, i.e., once the vacuum within a vacuum insulation panel has been substantially reduced or lost. Preferably, the contact portion will come into direct contact with the electrical contacts in a manner to provide electrical continuity between the electrical contacts. Accordingly, by providing the evaluator with a device suitable for determining the electrical continuity between the electrical contacts, such as, for example, an ohmmeter, the evaluator can more readily determine that the vacuum within a vacuum insulation panel has been substantially reduced or lost.

Figures 6A, 6B:
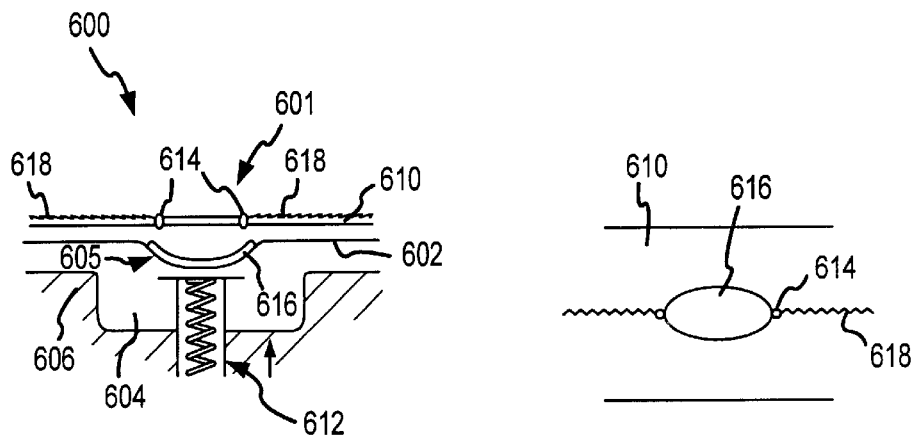
FIGS. 6A and 6B are cross-sectional views of yet another type of a visual detection system of a vacuum insulation panel in accordance with another embodiment of the present invention.

With reference to FIG. 6A, in accordance with one embodiment, a vacuum insulation panel 600 preferably includes a barrier film 602, a core material 606, and a vacuum detection indicator 601 preferably comprising a spring-like device 612 and a viewing window 610. Preferably, viewing window 610 includes at least one pair of electrical contacts 614 suitably arranged above a portion of barrier film 602 covering a cavity 604. Further, barrier film 602 preferably includes a contact portion 616 configured to interface, and thus provide electrical continuity between, electrical contacts 614.

Electrical contacts 614 can comprise any conductive alloys suitably configured to provide electrical conductivity, such as, for example, copper, aluminum, tin or the like. Moreover, electrical contacts 614 can be configured in virtually any shape, such as, for example, circular, rectangular or any other known shape, to facilitate the interfacing with a measuring device, such as, for example, an ohmmeter, suitable for determining the electrical continuity between electrical contacts 614. In accordance with this aspect, electrical contacts 614 preferably provide access to the measuring device by providing an outer surface suitable for interfacing with the measuring device, and may be configured to protrude above viewing window 610. Preferably, electrical contacts 614 are configured within viewing window 610 such that electrical contacts 614 may come into direct contact with contact portion 616. In accordance with this aspect, electrical contacts 614 preferably protrude from beneath viewing window 610. Although viewing window 610 preferably includes at least one pair of electrical contacts 614, viewing window may also include three, four or even more additional electrical contacts 614 suitably arranged above barrier film 602 approximate cavity 604, i.e., around the portion of barrier film 602 configured to provide a depression once a vacuum is drawn in between barrier film 602 and core material 606.

In accordance with another aspect, and with reference now to FIG. 6B, viewing window 610 may also comprise electrical conductive strips 618 suitably connected to electrical contacts 614 to provide a greater surface area to interface with the measuring device for determining the electrical continuity between electrical contacts 614. In accordance with this aspect, conductive strips 618 may comprise any conductive alloy suitably configured to provide electrical conductivity. Moreover, conductive strips 618 can be configured in any shape suitable for interfacing with the measuring device. Although conductive strips 618 are preferably configured onto an outer surface of viewing window 610, conductive strips 618 may also be configured within an interior as well as the outer surface of viewing window 610. Further, conductive strips 618 may be suitably configured to permit electrical contacts 614 to not be exposed directly to the outer surface of viewing window 610, and thus to the measuring device, but rather allow the electrical continuity between electrical contacts 614 to be determined solely by measuring electrical continuity between conductive strips 618.

Contact portion 616 preferably comprises any conductive alloy suitably configured to provide electrical conductivity, such as, for example, copper, aluminum, tin or the like. Moreover, contact portion 616 can be configured in virtually any shape, such as, for example, circular, rectangular or any other known shape, suitable for interfacing with, and providing electrical continuity between, electrical contacts 614. In accordance with this aspect, contact portion 616 is preferably configured above a portion of barrier film 602 capable of being deformed within cavity 604, i.e., a depression 605 of barrier film 602.

Accordingly, as a vacuum in panel 600 becomes subsequently reduced or lost, and spring-like device 612 becomes uncoiled or decompressed, spring-like device 612 suitably interfaces with depression 605 to force a corresponding portion of barrier film 502, and thus contact portion 616, towards electrical contacts 614. Once the vacuum in panel 600 has been substantially reduced, contact portion 616 preferably interfaces with, and provides electrical continuity between, electrical contacts 614. Accordingly, by providing the evaluator with a device suitable for determining the electrical continuity between the electrical contacts, such as, for example, an ohmmeter, the evaluator can more readily determine that the vacuum within vacuum insulation panel 600 has been substantially reduced or lost.

While the above embodiment illustrated in vacuum insulation panel 600 is configured to provide another positive indicator that the vacuum within an insulation panel has been substantially reduced or lost, various other embodiments may be configured for providing an evaluator with the ability to readily determine the integrity of the vacuum within a vacuum insulation panel. For example, the vacuum detection indicator may also comprise a fluid device, such as a membrane or a plunger-like component, containing colored dyes and configured beneath a viewing window such that upon loss of vacuum, the fluid device may be configured to deliver the colored dyes unto the underside of the viewing window. Further, the actuation of the fluid device may be enabled by a spring-like member as discussed above, or may be a result of the barrier film returning to its original configuration upon loss of the vacuum. Thus an evaluator can determine whether a vacuum has been lost by observing the viewing window to determine whether the colored dyes have been released by the fluid device.

Figure 8A:
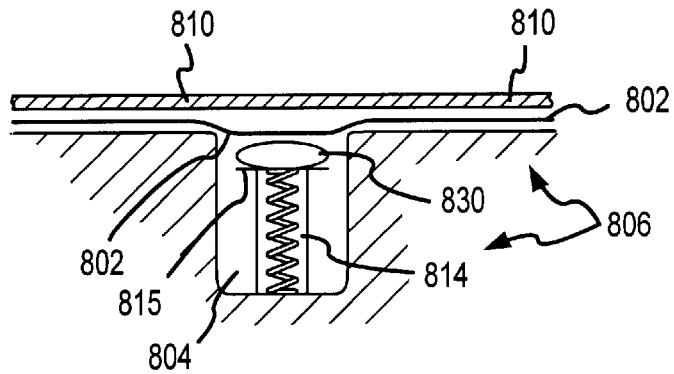
FIGS. 8A, 8B and 8C are a side view, a partial view and a top view, respectively, of yet another embodiment of vacuum detection system of a vacuum insulation panel in accordance with the present invention.

With reference to FIG. 8A, an exemplary vacuum insulation panel 800 suitably includes a barrier film 802, a core material 806, and a vacuum detection indicator 801 having a spring member 814 and base member 815, as described above. However, in addition to the above elements, vacuum insulation panel 800 also includes a fluid device 830 configured to contain a colored dye that may be delivered, dispensed or otherwise ejected from fluid device 830 to indicate the loss of the vacuum within panel 800. Fluid device 830 suitably comprises a membrane, a bag or other like component capable of containing colored dyes within in the absence of pressure exerted onto the outer surface, and to deliver, dispense or otherwise eject the colored dyes upon the exertion of a compression force onto the outer surface of the membrane or bag.

Although fluid device 830 can comprise a membrane, bag or other like component capable of containing colored dyes, the present embodiment is not limited to such a component. For example, fluid device 830 may also be configured as a plunger-like device, for example, a plunger and syringe device, such that pressure exerted by the plunger may force colored dyes within the syringe device to be forced through an orifice and into cavity 804, and thus be readily detected. Accordingly, fluid device 830 may comprise any component configured for containing colored dyes and dispensing the same upon application of a compression force.

Figure 8B:
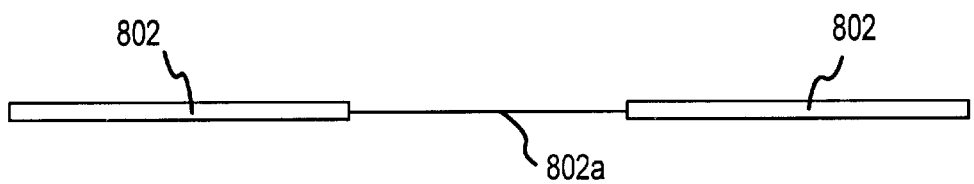
Figure 8C:
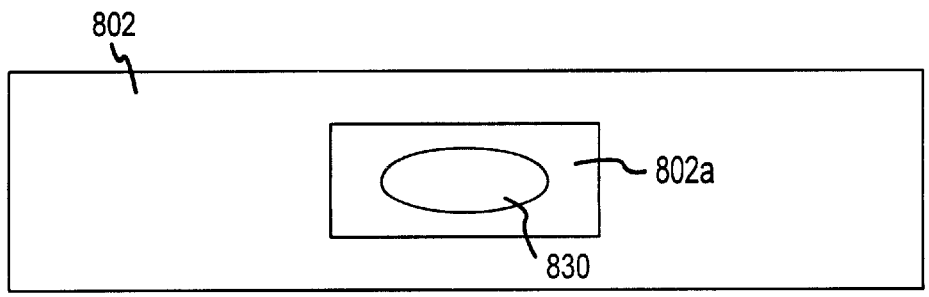

In addition, fluid device 830 is preferably configured between base member 814 and a transparent portion of barrier film 802, e.g., a viewing window, such as is illustrated in FIG. 8B. The viewing window may comprise a transparent plastic or other similar component suitably attached to barrier film in various known manners, such as by adhesive bonding, gluing or any other available means for attaching a component to a barrier film. Further, the viewing window may comprise a flexible material that may be readily deformed, or may comprise more rigid material compositions. Moreover, the viewing window is suitably configured such that fluid device 830 is readily visible by the evaluator of the panels, as illustrated, for example, in FIG. 8C.

In addition to the above elements, a protective cover 810 may also be configured around a portion of panel 800, for example, to substantially cover vacuum detection indicator 801, or at least cover a portion of the viewing window of barrier film 802. Further, cover 810 suitably comprises a transparent material, or at least includes a transparent portion, configured adjacent the viewing window such that fluid device 830, or any delivered, dispensed or otherwise ejected colored dye is readily visible by the evaluator of the panels.

Accordingly, upon the initial maintenance of a vacuum within panel 800, barrier film, 802 will be drawn into a cavity 804, thus compressing fluid device 830 and spring member 814. However, in the event the vacuum within panel 800 is reduced, the pressure exerted by spring member 814 will force fluid device 830 outwards from cavity 804 and against the viewing window and cover 810. Once the vacuum is lost, spring member 814 is suitably configured to provide a compression force against fluid device 830 such that any colored dyes contained within fluid device 830 can be suitably dispensed or ejected, such as through finite orifices within fluid device 830, or through rupture of fluid device 830, and within cavity 804. Accordingly, through the viewing window and cover 810, any such dispensed dyes may be readily detected by the evaluator to indicate a loss of vacuum within panel 800.

Figure 10A:
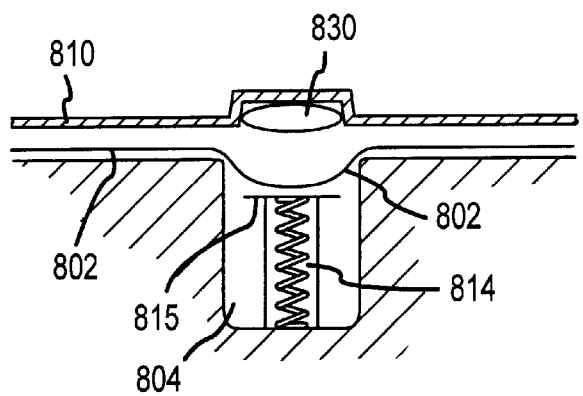
FIGS. 10A and 10B are side views of further embodiments of vacuum detection system of a vacuum insulation panel in accordance with the present invention.
Figure 10B:
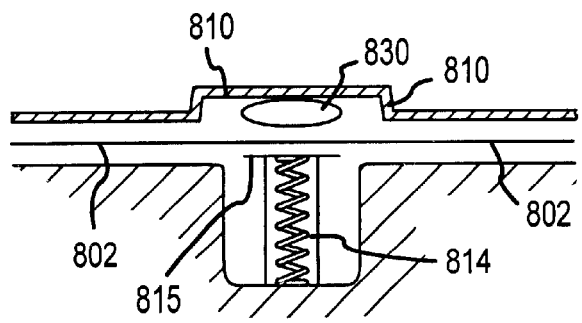

While the above exemplary application illustrates a fluid device 830 configured between a base member 815 and a barrier film 802, the present invention is not limited to such a structure and may be configured in various other manners and arrangements that are adapted to provide a readily detectable indication that the vacuum has been substantially reduced or eliminated within the vacuum insulation panel. For example, fluid device 830 may be configured between barrier film 802 and cover 810. In addition, with reference to FIGS. 10A and 10B, fluid device 830 may also be configured within a raised portion 812 of cover 810, and attached or otherwise connected to the underside of raised portion 812. Raised portion 812 suitably comprises a housing configured to contain fluid device 830, and configured to permit base member 815 to enter into raised portion 812 and thus come into contact with fluid device 830. Further, raised portion 812 preferably includes a substantially transparent feature to permit an evaluator to visibly detect or observe the presence of fluid device 830, as described above. Moreover, in that fluid device 830 is suitably positioned adjacent cover 810, a viewing window may not be provided within barrier film 802. Accordingly, when a vacuum is being maintained within panel 800, barrier film 802 compresses spring member 814. However, once the vacuum is lost, the decompression of spring member 814 forces base member 814 and thus barrier film 802 against fluid device 830 to thereby dispense or otherwise eject the colored dyes within panel 800, such that an evaluator may readily detect the presence of colored dyes through the transparent features of raised portion 812.

As discussed above, fluid device 830 may be configured between cover 810 and base member 815 in various manners to provide the intended functions for indicating loss of vacuum. In addition to the positional arrangements described above, fluid device 830 may be configured to dispense, deliver or otherwise eject any colored dyes contained within at the direction of any number of varying compression forces applied to an outer surface of device 830. Meanwhile, spring member 814 may be configured with various tension settings, depending on any number of design criteria, to allow spring member 814 to suitably contract and expand. These tension design criteria can be realized in any number of ways to control the spring tension within a small variance, e.g., within a few torr of the desired tension setting, such as through the selection of various alloys, plastics and the like, or the thickness of the spring member, as well as other conventional factors for obtaining desired tension settings in spring members.

Figure 9:
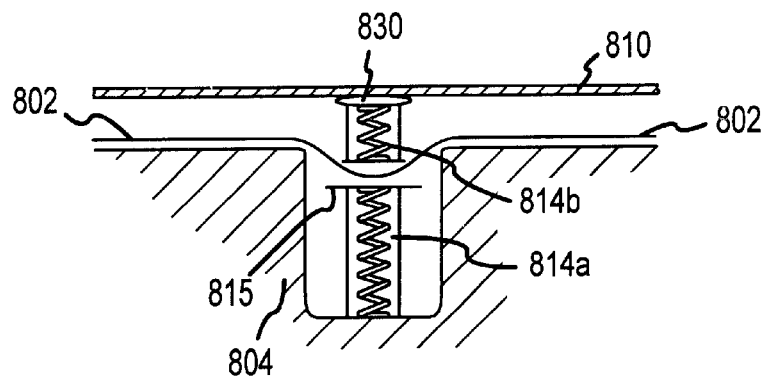
FIG. 9 is a side view of yet another embodiment of vacuum detection system of a vacuum insulation panel in accordance with the present invention.

In addition to the above methods for controlling spring tension, additional spring members 814 may be suitably included within vacuum detection indicator 801, for example, a series of spring members 814 stacked beneath barrier film 802 and core material 804. Further, such additional spring members 814 may be suitably included between barrier film 802 and cover 810 to provide additional tension control. With reference to FIG. 9, for example, additional spring member 814b may be attached or otherwise coupled to fluid device 830 and adjacent the outer surface of barrier film 802. Preferably, spring members 814a and 814b are configured with opposing compression forces such that the spring tension for spring member 814a is sufficiently greater than the spring tension of spring member 814b. Accordingly, as a vacuum is maintained within panel, and barrier film 802 is drawn into cavity 804, spring member 814a will be compressed by barrier film 802 and the opposing spring tension of spring member 814b. However, once the vacuum has been substantially reduced or eliminated, spring member 814a will suitably expand to force spring member 814b into compression and to apply a like force onto the outer surface of fluid device 830, thus causing the discharging or otherwise dispensing of colored dye from device 830.

Figure 11:
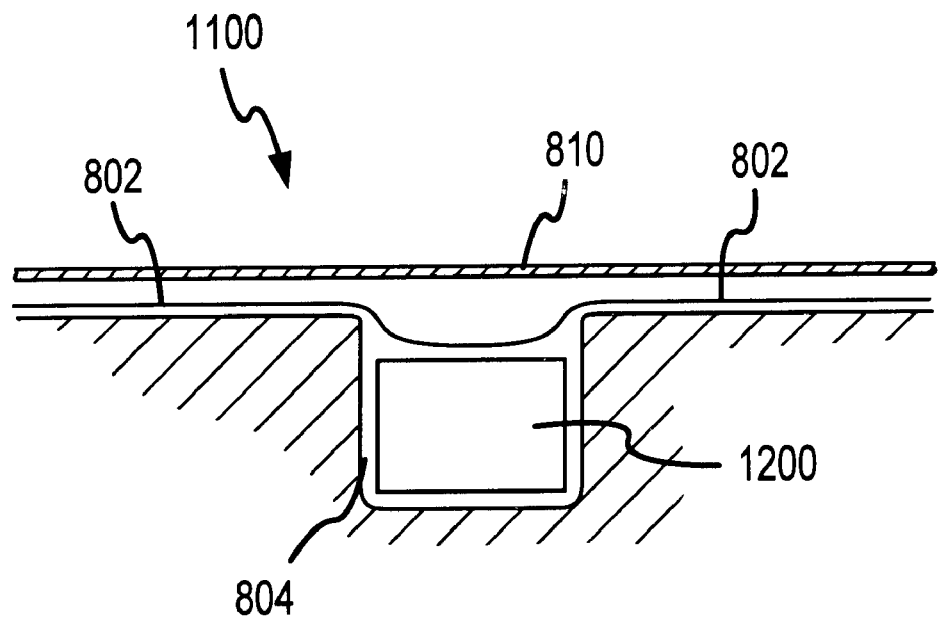
FIG. 11 is a side view of yet another embodiment of vacuum detection system of a vacuum insulation panel in accordance with the present invention.
Figure 12:
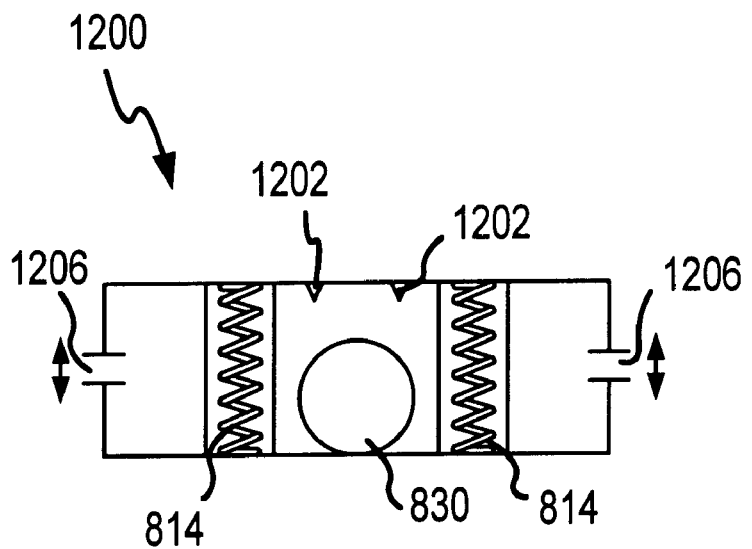
FIG. 12 is a side view of an exemplary vacuum detection device as may be utilized in the system of FIG. 11.

While spring members 814 can be effectively utilized to apply a compression force against fluid device 830 in numerous manners, such as those described above, still other variations are applicable. In accordance with another embodiment, a vacuum detection indicator may include additional elements or steps to facilitate the discharging or dispensing of colored dyes. For example, rather than have the colored dyes dispensed by fluid device 830 subsequent to a loss of pressure, the colored dyes may be discharged by fluid device 830 into a reservoir that contains the colored dye upon the initiation of a vacuum within the panel, and releases the colored dyes upon loss of the vacuum. With reference to FIGS. 11 and 12, one such exemplary embodiment is illustrated.

In this embodiment, a vacuum insulation panel 1100 comprises a vacuum detection indicator comprising a reservoir 1200 having at least one container seal 1206, at least one spring member 814, a fluid device 830, and at least one puncture device 1202. Container seal 1206 is configured to suitably contain colored dyes within reservoir 1200 once discharged from fluid device 830. Meanwhile, puncture device 1202 is suitably configured to puncture fluid device 830, such as a membrane and the like, to discharge colored dyes into reservoir 1200. Spring member 814 is suitably configured to maintain an opening of container seals 1206 in the absence of a sufficient force applied by barrier film 802 applied to the outer surface of reservoir 1200.

During operation, once a vacuum is developed within panel 1100, the subsequent drawing of barrier film 802 into cavity 804 will provide a compression force to reservoir 1200, and thus spring member 814, to suitably puncture fluid device 830, as well as close container seal 1206. However, upon loss of vacuum, colored dyes present within reservoir 1200 can be discharged through container seals 1206 as spring member 814 exerts an expansion force against the inner walls of reservoir 1200. Accordingly, an evaluator can readily detect the presence of colored dye through the available viewing portion of cover 810, and thus conclude that the vacuum has been lost within panel 1100.

Alternatively, as briefly noted hereinabove, reservoir 1200 may suitably comprise a gas indicator of a chemical or mechanical configuration. Upon the detection of a desired gas, for example, air, indicator may change (for example, change color), which change can be viewed through viewing window 810. Alternatively, barrier film 802 may comprise an entirely transparent material.

The present invention has been described above with reference to various preferred embodiments. However, those skilled in the art will recognize that changes and modifications may be made to the various exemplary embodiments without departing from the scope of the present invention. For example, rather than providing a conductive contact portion onto the barrier film, the barrier film may be suitably configured to be a highly conductive strip that can provide electrical continuity between the electrical contacts of the viewing window. In addition, various other configurations and arrangements of the spring members, fluid devices and viewing windows, now known or hereinafter devised, can be utilized to provide a readily detectable indicator of a loss of vacuum, and such other additional configurations are not described herein. For example, the base members may be directly configured within the barrier films, or separately attached by various methods. In addition, multiple fluid devices may be utilized with a unity vacuum detection indicator, for example, beneath and/or above the barrier film. Accordingly, these and other changes or modifications are intended to be included within the scope of the present invention.

We claim:

1. A method for detecting the presence of a vacuum within a vacuum insulated panel, said method comprising the steps of:
    providing an opening within a core material of said vacuum insulated panel;
    drawing a vacuum within an interior of said vacuum insulated panel formed by a barrier film such that said barrier film forms a depression when said vacuum is drawn;
    providing a spring member attached to a bottom portion of said opening and a pair of electrical contacts configured with a viewing window covering said opening, said spring device being configured for compression when the vacuum is being drawn; and
    extending said spring member to force said barrier film against said pair of electrical contacts to provide an indication of loss of the vacuum.

2. The method according to claim 1, wherein said step of extending said spring member comprises forcing a contact portion configured within said barrier film into contact with said pair of electrical contacts.

3. The method according to claim 2, wherein said step of extending said spring member comprises urging a base member coupled to said spring member against said contact portion to force said contact portion into contact with said pair of electrical contacts.

4. The method according to claim 3, wherein said step of extending said spring member comprises forcing said contact portion against conductive strips configured within said viewing window and in electrical connection with said pair of electrical contacts.

5. The method according to claim 2, wherein said method further comprises the step of assessing whether the vacuum is maintained through assessment of electrical continuity between said pair of electrical contacts.

6. A vacuum detection indicator for detecting the presence of a vacuum in a vacuum insulated panel, said vacuum detection indicator comprising:
    a spring device operatively configured within a cavity of a core material of the vacuum insulated panel, such that said spring device is compressed when the vacuum is present within the vacuum insulated panel, and said spring device is expanded when the vacuum is absent within the vacuum insulated panel, wherein said spring device comprises:
        a spring member attached to a bottom portion of the cavity and operatively coupled with a portion of a barrier film covering the cavity; and
    electrical contacts configured above the cavity of the core material, said electrical contacts configured to connect to said barrier film when the vacuum within the vacuum insulated panel is lost.

7. The vacuum detection indicator according to claim 6, wherein said spring device further comprises a base member attached to said spring member and configured to interface said portion of said barrier film.

8. The vacuum detection indicator according to claim 7, wherein said electrical contacts are configured on a side of the barrier film opposite that interfaced by said base member.

9. The vacuum detection indicator according to claim 8, wherein said base member is configured to urge a contact portion of the barrier film against both said first contact and said second contact.

10. The vacuum detection indicator according to claim 7, wherein said electrical contacts comprise a first contact and a second contact.

11. The vacuum detection indicator according to claim 10, wherein said electrical contacts further comprise conductive strips coupled to said first contact and to said second contact.

12. The vacuum detection indicator according to claim 6, wherein said electrical contacts are configured with a viewing window covering the cavity of the core material.

13. A vacuum insulated panel for use in temperature sensitive applications, said vacuum insulated panel comprising:
    an open-cell insulated core material;
    a barrier film enclosing said core material and configured for maintaining a vacuum within said vacuum insulated panel; and
    a vacuum detection indicator, said vacuum detection indicator configured for facilitating an evaluation of the vacuum within said vacuum insulated panel, said vacuum detection indicator comprising:
        a spring member operatively configured within a cavity of a core material of the vacuum insulated panel, such that said spring member is compressed when the vacuum is present within the vacuum insulated panel, and said spring member is expanded when the vacuum is absent within the vacuum insulated panel, said spring member attached to a bottom portion of the cavity;
        a base member attached to said spring device and being configured to interface with a portion of a barrier film covering the cavity; and
    electrical contacts configured above the cavity of the core material, said electrical contacts configured to have electrical connection through said barrier film when the vacuum within the vacuum insulated panel is lost.

14. The vacuum insulated panel according to claim 13, wherein said electrical contacts are configured on a side of the barrier film opposite that interfaced by said base member.

15. The vacuum detection indicator according to claim 13, wherein said base member is configured to urge a contact portion of the barrier film against said electrical contacts.

16. The vacuum detection indicator according to claim 13, wherein said electrical contacts are configured with a viewing window covering the cavity of the core material.

17. The vacuum detection indicator according to claim 13, wherein said electrical contacts comprise a first contact and a second contact.

18. The vacuum detection indicator according to claim 17, wherein said electrical contacts further comprise conductive strips coupled to said first contact and to said second contact.

19. The vacuum detection indicator according to claim 18, wherein said conductive strips are configured to facilitate measurement of electrical continuity by an external instrument.

20. The vacuum detection indicator according to claim 17, wherein said first contact and said second contact are spaced substantially across the cavity of the core material.

* * * * *

UNITED STATES PATENT AND TRADEMARK OFFICE
CERTIFICATE OF CORRECTION

PATENT NO. : 6,659,037 B2
DATED : December 9, 2003
INVENTOR(S) : Eric M. Hagopian It is certified that error appears in the above-identified patent and that said Letters Patent is hereby corrected as shown below:

Title page,
Item [54], Title, please replace the title with the following:
-- METHOD AND APPARATUS FOR EVALUATING VACUUM INSULATION PANELS --

Signed and Sealed this

Twenty-seventh Day of July, 2004

JON W. DUDAS
*Acting Director of the United States Patent and Trademark Office*